Oct. 17, 1961  L. A. WADLEY  3,004,501
SHAPING EQUIPMENT
Filed July 21, 1959  2 Sheets-Sheet 1
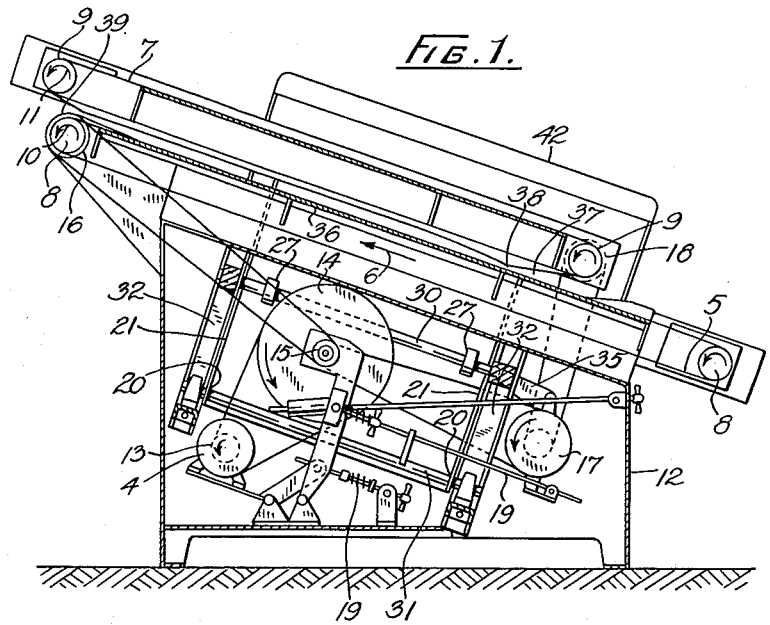
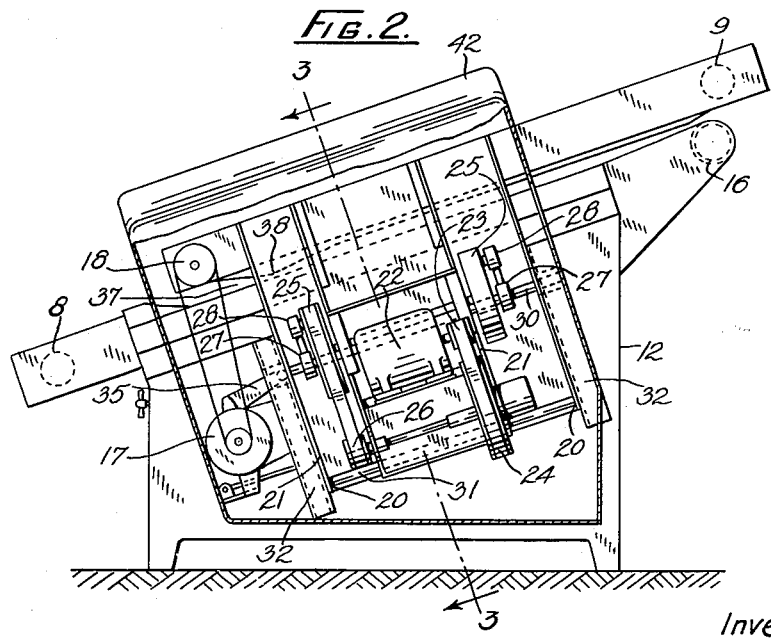
Inventor
LIONEL AUBREY WADLEY
By Toulmin & Toulmin
Attorneys

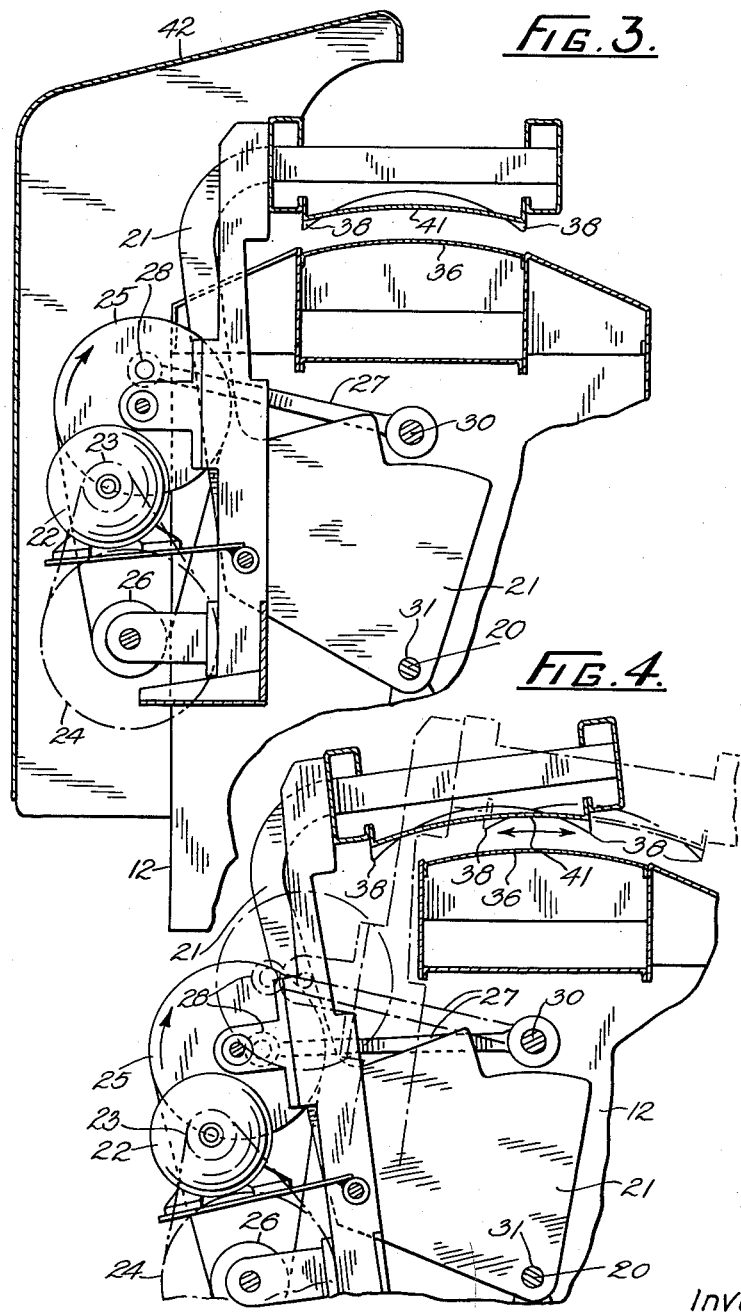

United States Patent Office 3,004,501
Patented Oct. 17, 1961

3,004,501
SHAPING EQUIPMENT
Lionel Aubrey Wadley, 147 William Road, Norwood, Johannesburg, Union of South Africa
Filed July 21, 1959, Ser. No. 828,523
Claims priority, application Union of South Africa July 23, 1958
7 Claims. (Cl. 107—9)

This invention relates to shaping equipment for the baking industry commonly referred to as rounding equipment. In rounding equipment a lump of dough is worked into a spherical shape.

There are several makes of rounding machines in existence and though some, no doubt, are capable of producing the desired sphere most are inclined to round the dough into a shape similar to the well known child's top. In other words the mass comes out of the machine with a pointed tail.

Known machines include the umbrella cone type, the inverted cone type and certain kinds employing conveyor belts.

The umbrella type of machine rolls dough between its outer surface and a stationary shell. It is an expensive machine and in some quarters it is looked upon as being harsh in its action on soft flours. Means is required to keep the dough rolling surfaces dry and the surfaces being metallic are inclined to blacken the dough. These machines require cleaning at frequent intervals to remove dough particles adhering to the surfaces; if the particles are not removed the efficiency of the machine is impaired.

In the inverted conical rounder rounding takes place within the cone, the dough being located between the cone surface and a spiral half-moon shaped channel. The disadvantages and drawbacks of this machine are substantially the same as those encountered with the umbrella machine.

A well known type of conveyor belt rounder is one employing two belts located one above the other in planes which intersect diagonally. The dough moves along the belts across their lines of movement and in the course of its travel the dough is rotated by the belts into a top-like shape. The major drawback here is the final shape of the dough mass, the top shape being more accentuated than is the case with the product of either of the previously described machines.

A further type of rounder employing a conveyor belt is one having a half-moon shaped guide channel lying diagonally across the belt. Along the edge of the channel nearest the belt there is a roller which acts to rotate the dough mass as it is carried up the channel by the belt. This machine gets dirty very easily, is difficult to adjust and is costly to maintain in that the roller tends to break-down at frequent intervals.

Another type of conveyor belt rounder is one in which a channel shaped duct is located over a conveyor belt and the duct is oscillated over the belt as the dough mass moves forward between the conveyor belt and the duct. One objection to this type of rounder is that the dough mass, in being forced into its final shape, is brought into engagement with the sides of the channel shaped duct.

It is an object of the present invention to provide a dough rounder which in some respects is superior to the machines described above.

Apparatus according to the invention comprises two spaced conveyor belts, the first belt being arranged to move in a fixed path, the second belt being concave towards the first belt about a line of curvature beyond the first belt, and the first belt being curved substantially concentrically with the second belt, means to move the belts in opposite directions, and means to oscillate the second belt substantially about its line of curvature.

To illustrate the invention an embodiment is described hereunder with reference to the accompanying drawings in which—

FIGURE 1 is a sectional side elevation with parts broken away of a dough rounding machine in accordance with the invention.

FIGURE 2 is a further sectional side elevation opposite to that shown in FIGURE 1.

FIGURE 3 is an enlarged end elevation with parts broken away on the line 3—3 of FIGURE 2, and FIGURE 4 is a schematic end elevation showing the equipment at various stages in its cycle of operation.

Referring to the figures, the machine of the invention includes a lower endless belt 5, the upper surface of which is adapted to move in the direction of arrow 6, and an upper endless belt 7 adapted to be driven in the same rotational sense as the lower belt. Both belts are located over rollers 8 and 9 respectively which rotate in the manner shown by arrows 10 and 11.

All the equipment associated with the machine is mounted on a chassis 12 which is suitably covered in for appearance sake. A single electric motor 4 is used to drive both belts through suitable pulleys 13, 14, 15, 16, 17 and 18, the diameter of the pulleys being selected to bring about the desired speed requirements of the belts. In the embodiment the lower belt 5 is moved at a greater speed than the upper belt 7. The apparatus shown at 19 is for tensioning the belts.

As seen in section in FIGURES 3 and 4 the upper bight of the lower belt 5 is located over a foundation 36 which imparts to the belt surface a downwardly concave shape and the upper belt 7 moves under a similar foundation 41 which gives the lower bight of that belt a concentrically downwardly concave shape. These features are illustrated in FIGURES 3 and 4. The centre of curvature of the concave bights of the belts coincides with the axis of a shaft 31 to be described later on.

The belt 7 and its pulleys have to be oscillated about the axis of the shaft 31. This is achieved by mounting the belt 7 on pivot arms 21 mounted on the shaft 31 which is pivoted on guides 32 provided by the chassis 12 at points 20. A second electric motor 22 is mounted on structure provided by the arms 21. Through suitable reduction arrangements provided by pulleys 23, 24 and 26 the motor 22 drives pulleys 25. Arms 27 are pivoted to the pulleys 25 at points 28. The arms 27 in turn are coupled to a shaft 30 journalled in bearings on the guides 32 provided by the chassis 12.

Thus as the motor 22 rotates the pulleys 25 rotate and pull the arms 21 to and fro about the axis of the shaft 31 as a result of the crank action of the arms 27. In the result the upper belt 7 oscillates across the width of the lower belt between the position shown in full line in FIGURE 4 and the position shown in chain line in the same figure.

A further feature of the upper belt is that its lower section starts off in the throat area 37 of the machine by providing depressed wing zones 38 as shown in the figures. It has been found in experimental work that by having the depressed wing zones 38 a lump of dough falling into the throat area is suitably centered to commence the rounding operation.

When rounding is to take place the belts are switched on and the upper belt is caused to oscillate across the width of the lower belt.

A lump of dough is then brought up into the throat area 37 of the machine and is centered on the belts as it moves into the area of the wing zones 38. The combined movement of the two belts acts on the dough mass in such a way that by the time the mass appears at the output end 39 of the equipment it is formed into a lump of substantially spherical shape. The reference 42 indicates a staitionary cover for the oscillating components of the machine.

In experiments it has been found that with a lower belt speed of 150 ft./min., an upper belt speed of 75 ft./min. and reciprocating the belt at a rate of about 70 oscillations per minute with an amplitude of oscillation of about 4 inches an end product of substantially spheroid shape is produced.

The type of belts used is left to the user but it is probably advisable to employ belts having reasonably high absorbent qualities.

One further advantage of the apparatus of the invention is that it may be made to work the dough mass more gently than is normally possible with most existing apparatus.

I claim:

1. Apparatus for forming a mass of dough into a spheroidal shape comprising two spaced conveyor belts, the first belt being arranged to move in a fixed path, the second belt being concave towards the first belt about a line of curvature beyond the first belt, and the first belt being curved substantially concentrically with the second belt, means to move the belts in opposite directions, and means to oscillate the second belt substantially about its line of curvature.

2. The apparatus claimed in claim 1 including wing zones on the second belt for centering masses of dough fed between the belts.

3. The apparatus claimed in claim 1 including a chassis for the first belt and at least one arm pivoted on the chassis which arm carries the second belt.

4. The apparatus claimed in claim 3 including a driven wheel on the arm, an eccentric pin on the wheel, and a crank arm pivoted on the chassis and the pin.

5. Apparatus for forming a mass of dough into a spheroidal shape comprising two spaced, substantially horizontal conveyor belts, the lower belt being arranged to move in a fixed path, the upper belt being concave downwardly about a line of curvature below the lower belt, and the lower belt being curved substantially concentrically with the upper belt, means to move the belts in opposite directions, and means to oscillate the upper belt substantially about its line of curvature.

6. The apparatus claimed in claim 5 including a chassis for the lower belt and in which the means to oscillate the upper belt includes arms pivoted on the chassis, the arms carrying the second belt, a driven wheel on each arm, an eccentric pin on each wheel, and a crank arm pivoted on each pin and the chassis.

7. The apparatus claimed in claim 6 including wing zones on the upper belt for centering masses of dough fed between the belts.

References Cited in the file of this patent

UNITED STATES PATENTS

| 925,235 | Scott et al. | June 15, 1909 |
| 936,660 | Petri | Oct. 12, 1909 |

FOREIGN PATENTS

| 299,221 | Great Britain | Oct. 25, 1928 |
| 314,510 | Italy | Jan. 29, 1934 |
| 448,049 | Germany | Aug. 6, 1927 |
| 486,424 | Germany | Nov. 4, 1930 |